(12) United States Patent
Stark

(10) Patent No.: US 8,122,913 B2
(45) Date of Patent: Feb. 28, 2012

(54) HIGH PRESSURE HOSE PROTECTOR

(76) Inventor: Gordon William Stark, Mount Evelyn (AU)

( * ) Notice: Subject to any disclaimer, the term of this patent is extended or adjusted under 35 U.S.C. 154(b) by 154 days.

(21) Appl. No.: 12/685,678

(22) Filed: Jan. 12, 2010

(65) Prior Publication Data

US 2010/0175773 A1    Jul. 15, 2010

(30) Foreign Application Priority Data

Jan. 12, 2009 (AU) ............................. 2009900087

(51) Int. Cl.
*F16L 11/00* (2006.01)

(52) U.S. Cl. ........ 138/110; 138/120; 138/155; 138/106; 285/154.2; 59/78.1

(58) Field of Classification Search .................. 138/110, 138/106, 119, 120; 254/134.3 FT, 134.3 R; 285/154.2; 59/78.1
See application file for complete search history.

(56) References Cited

U.S. PATENT DOCUMENTS 2,972,857 A * 2/1961 Bodman ..................... 59/78.1
(Continued)

*Primary Examiner* — Patrick F Brinson
(74) *Attorney, Agent, or Firm* — Roger A. Jackson

(57) ABSTRACT

A hose or cable protector has a pair of articulating guides, each with rollers for creating an arcuate hose path around the sharp corner of a tunnel mouth which would otherwise cause abrasion to the hose. A stop imposes a guide to guide angle of eighty (80) degrees but the usual angle is greater and up to one hundred and twenty (120) degrees. Arches span the guides and retain the protector on the hose or cable. In a variant, the arches are spring loaded and adjustable to retain or release the hose. A control line positions the protector at the selected site.

10 Claims, 5 Drawing Sheets

U.S. PATENT DOCUMENTS

| | | | | |
|---|---|---|---|---|
| 3,110,479 A | * | 11/1963 | Eitel | 254/134.3 PA |
| 3,351,968 A | | 11/1967 | Masters | 15/104.3 |
| 3,772,875 A | * | 11/1973 | Viano | 59/78.1 |
| 4,228,990 A | * | 10/1980 | Horvath | 254/134.3 FT |
| 4,260,119 A | * | 4/1981 | Price | 242/157 R |
| 4,278,238 A | * | 7/1981 | Vugrek | 254/134.3 FT |
| 4,447,013 A | * | 5/1984 | Sandered et al. | 254/134.3 R |
| 4,529,171 A | * | 7/1985 | Woodruff | 254/134.3 FT |
| 6,182,676 B1 | | 2/2001 | Lee | 134/167 |
| 6,463,728 B1 | * | 10/2002 | Daoud | 59/78.1 |
| 6,787,702 B2 | * | 9/2004 | Suzuki | 174/72 A |
| 6,916,014 B1 | * | 7/2005 | Thomas | 254/134.3 R |
| 7,658,351 B2 | * | 2/2010 | Hansen | 248/74.3 |
| 7,862,257 B2 | * | 1/2011 | Jeong et al. | 405/184.4 |

* cited by examiner

HIGH PRESSURE HOSE PROTECTOR

RELATED APPLICATION

This application claims priority from Australian Provisional Patent Application No. 2009900087 filed on Jan. 12, 2009 by Gordon William Stark.

FIELD OF THE INVENTION

This invention concerns hose protectors for use in maintenance operations in sewers and other subterranean pipes.

BACKGROUND OF THE INVENTION

All underground pipes which conduct liquid tend to act as habitats for organisms which multiply and form deposits. The deposits produce drag on the liquids and suspended solids in the pipe and impede flow. Changes in pipe direction may cause accumulations of solids which must be removed periodically.

Camera investigation generally precedes any cleaning operation. If a deposit is detected, a spray head fed by a water hose is lowered down the vertical access shaft into the horizontal pipe which contains the deposit. The access shaft is upstream of the deposit so that the pipe fall assists in carrying the flushed deposits downstream.

The water hose emits jets of water at mains pressure (4 bar) and as the hose is fed from a reel, the head retreats upstream dislodging deposits as it goes. When the section of pipe has been cleaned, the head is retrieved by exerting tension on the hose. During this recovery the hose turns the corner where the shaft meets the pipe and considerable abrasion occurs. The hose deteriorates and eventually becomes unfit for use and must be replaced. Even if the corners were chamfered or radiussed, the friction would be considerable because the head is heavy and if the water flow is maintained during recovery, the forces are substantial. The coefficient of friction between the polymer of the hose and the surface of the concrete is high and the operational life of the hose is unduly shortened.

U.S. Pat. No. 3,351,968 to Masters describes a hose guide for sewers and waste conduits consisting of a first frame of beams which span the manhole on the surface and support a central pulley which turns the entrant hose through about 90 degrees and passes it to a second frame which is subterranean and is lodged in the intersection between the vertical shaft beneath the manhole and the horizontal conduit to be cleaned. The second frame in Masters also has a central pulley which turns the hose through another 90 degrees. These keep the hose in the centre of the intersection in Masters and the vertical shaft and consequently no contact between the hose and the intersecting conduit wall occurs. Deployment of the frames in Masters requires extra time and labour and the second frame is an obstacle to the cleaning operations.

An attempt to dispense with pulleys is seen in U.S. Pat. No. 6,182,676 to Lee, wherein the mouth of the horizontal conduit is covered over part of its circumference with an arcuate pad which is scalloped to guide the hose around the corner at the mouth of the conduit.

Likewise when electric cables are fed into pits at the entry of a horizontal micro bore the cable must be fed from a reel on a vehicle above the pit and the cable must turn about 100 degrees to enter the micro bore. In mines, hydraulic hoses may have to turn corners to supply equipment working in shafts. The same problem emerges.

SUMMARY OF THE INVENTION

The apparatus aspect of the invention provides a hose or cable protector inter alia for subterranean work, comprising means to engage an external corner which joins an access shaft with a horizontal pipe and means defining an arcuate hose path around the external corner.

The means to engage the external corner may be of variable geometry in order to conform to the corner which will usually be substantially a right angle but is sometimes greater than a right angle. In a preferred embodiment, the means is a pair of elongated hose guides which articulate between a thread position in which they are colinear and a working position in which they lie substantially at 90 degrees. The means preferably includes hose engagers which extend from the guides and maintain attachment of the protector to the hose while allowing the hose to run through the protector. The hose engagers may be hooks or loops through which the hose passes easily. These allow the protector to be attached and run down the hose to the site of the corner.

The connected ends of both guides are of complementary shape so as to limit the working angle to 80-120 degrees. The preferred angle is 110 degrees. When the protector is on the hose, the hose is tensioned around the corner, the guides lie at 100-110 degrees. The guides may be somewhat wider than the hose.

The means defining an arcuate path around the external corner may be a series of wheels or rollers supported in the guides over which the hose runs.

Alternatively, the means may be a series of tube supports and a tube of flexible material through which the hose runs.

In a preferred embodiment, the guides each comprise a pair of side plates joined by rods, each of which in turn supports a hose roller. The rods may be disposed in an arc of such a curvature as will turn the hose smoothly through 90 degrees-110 degrees when the protector is in the working position.

Each guide has a hose retainer which keeps the hose close to the guide. Preferably the retainer is an arch which moves between a hose release position and a hose retention position. In the retention position, the arch overlies the hose lying transversely above the hose path. In the release position, the arch lies parallel to the guide allowing the guide to separate from the hose. Conveniently the arch rotates between the two positions. In the retention position, the arch may engage a detent under spring force. The operator slides the arch upwards and rotates it across the path of the hose and releases it in order to engage the detent on the wall of the guide. There it remains until the operator reverses the motion.

BRIEF DESCRIPTION OF THE DRAWINGS

One embodiment of the invention is now described with reference to the accompanying drawings, in which:

FIG. 5b is a section of the variant of 5a.

DETAILED DESCRIPTION WITH RESPECT TO THE DRAWINGS

Figure 1:
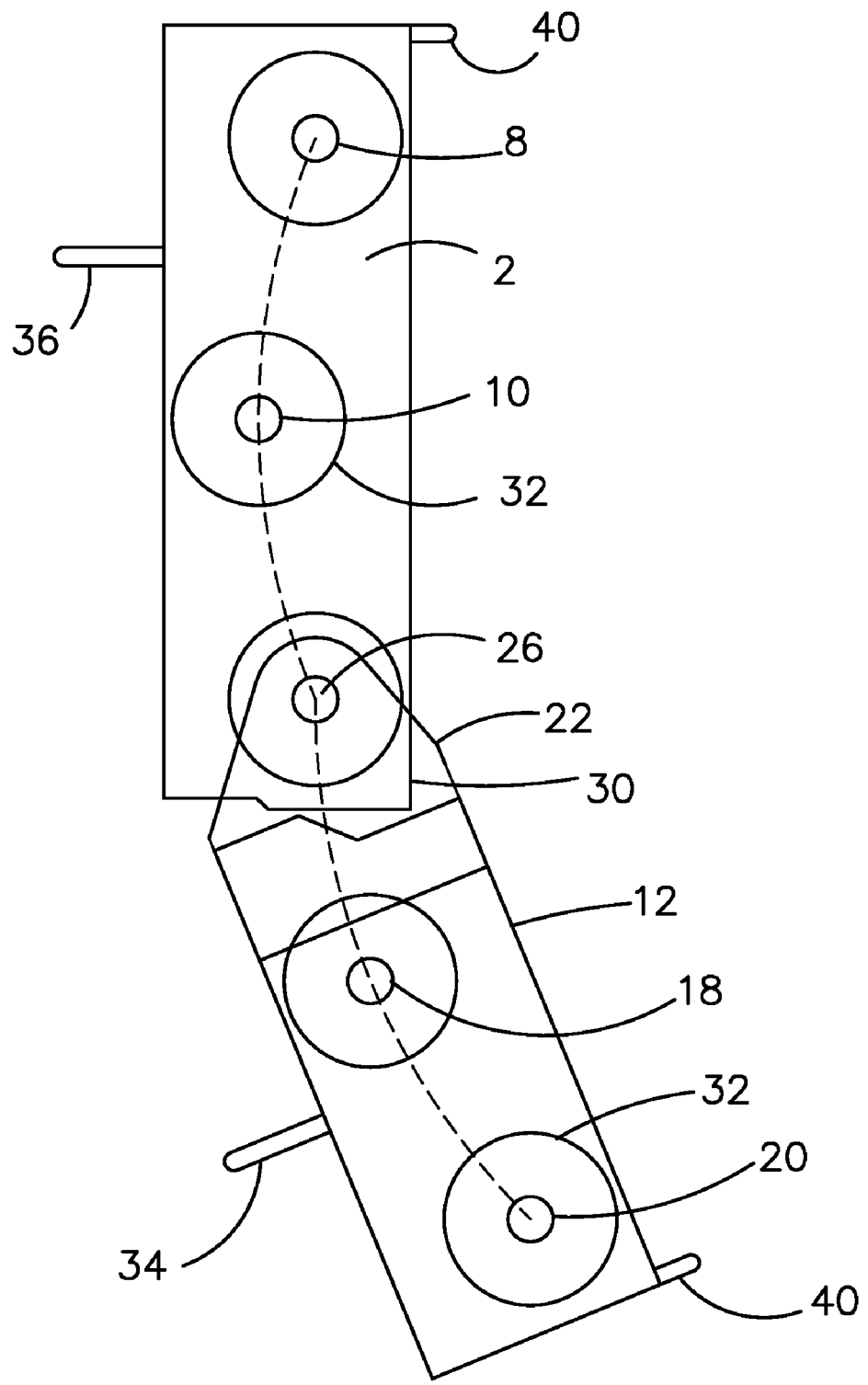
FIG. 1 is a side view of the protector in FIG. 3 in the working position.

Referring now to the drawings, an upper hose guide 2 is fabricated from a pair of steel plates 4, 6, each 300×20 mm joined by a pair of bolts 8, 10. Lower hose guide 12 is likewise fabricated from a pair of steel plates 14, 16 joined by a pair of bolts 18, 20.

The lower plates 14, 16 each have a welded lug 22, 24 which overlaps the end of the lower hose guide and the lugs form a pair, pierced by bolt holes. These register with a pair of bolt holes in the overlapped end of the upper hose guide. A common bolt 26 passes through all four bolt holes allowing the upper and lower guides to articulate about the common axis. The end of the lower guide 12 adjacent the bolt 26 has a step 28 which mutually obstruct with corner 30 when the guides move from the colinear position in FIG. 2 to the near L-section shown in FIG. 1.

Figure 2:
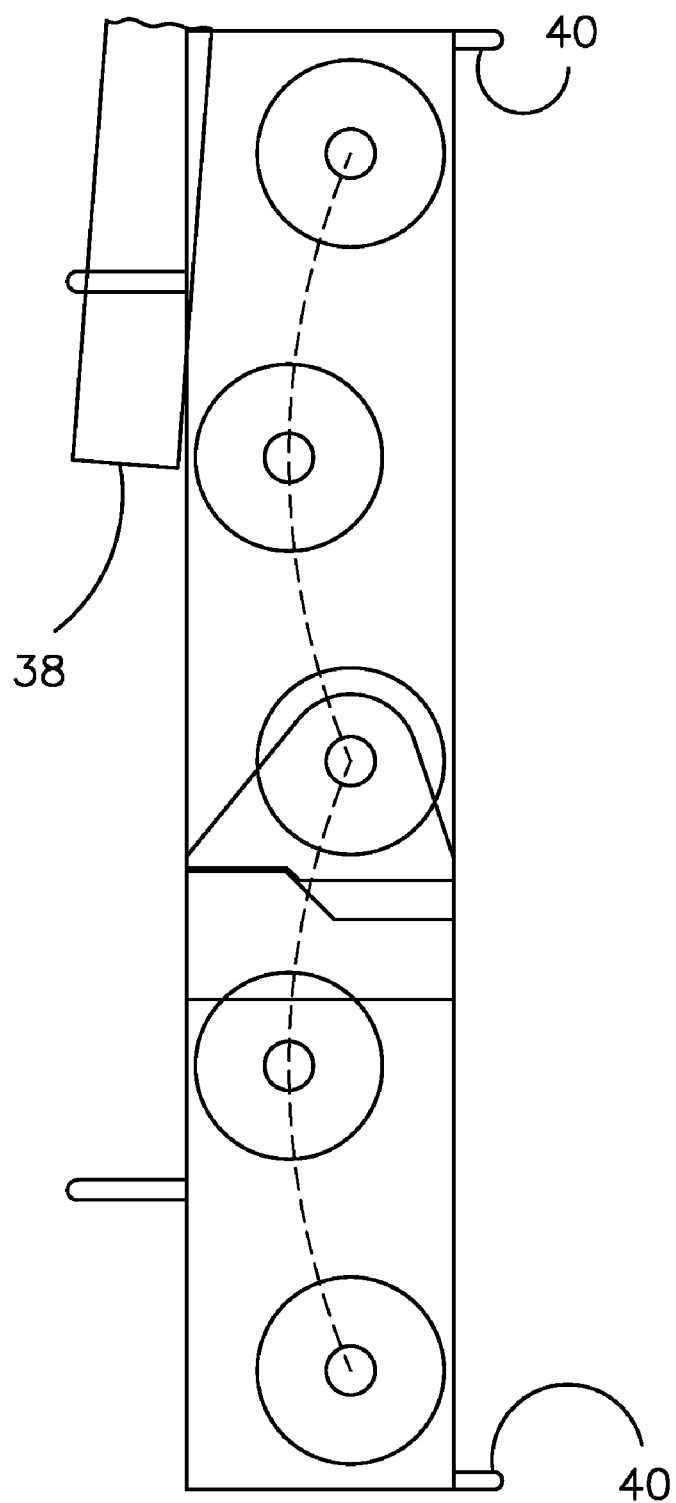
FIG. 2 is a side view of the protector in FIG. 3 in the thread position.
Figure 3:
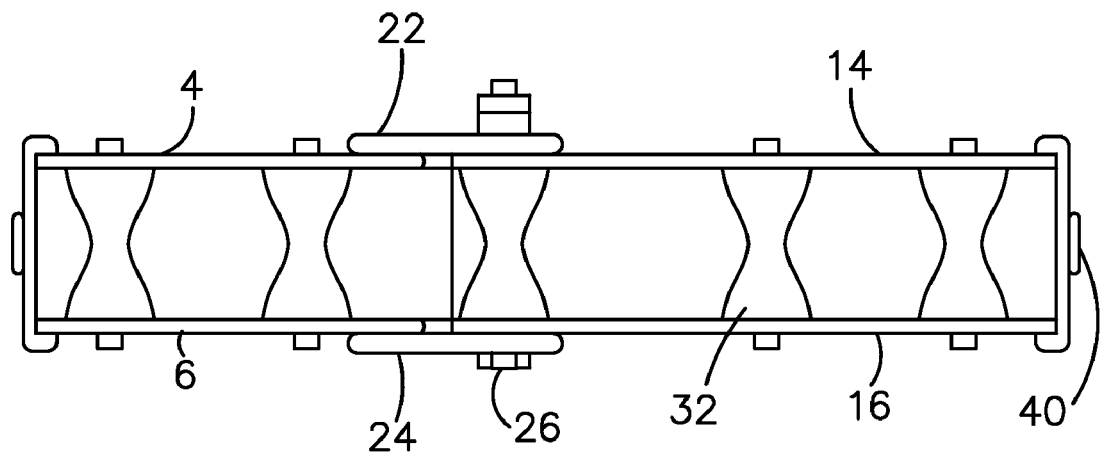
FIG. 3 is a plan of the protector.

The near L-section shown in FIG. 1 approximates to an obtuse angle of 135 degrees. Each of the four bolts together with common bolt 26 support a capstan-shaped polyethylene roller 32. Bolts 10 and 18 are offset by about 10 mm from the companion bolts 8, 20, 26, the purpose being to define a curved path for the hose when the guides take up their working positions.

Arches 34, 36 extend from the outer sides of the plates. These allow the hose 38 to be threaded through them. Threading ensures the protector cannot detach from the hose unintentionally. An eye 40 at each end allows the protector to be suspended from a wire 42 and retrieved when required.

In a non-illustrated embodiment, the mutual obstruction of the two ends to ensure the working angle of 135 degree is ensured by the provision of a pair of angle iron bridges across the guides. These come into contact when the working angle is reached. When the guides open, the bridges separate.

Figure 4:
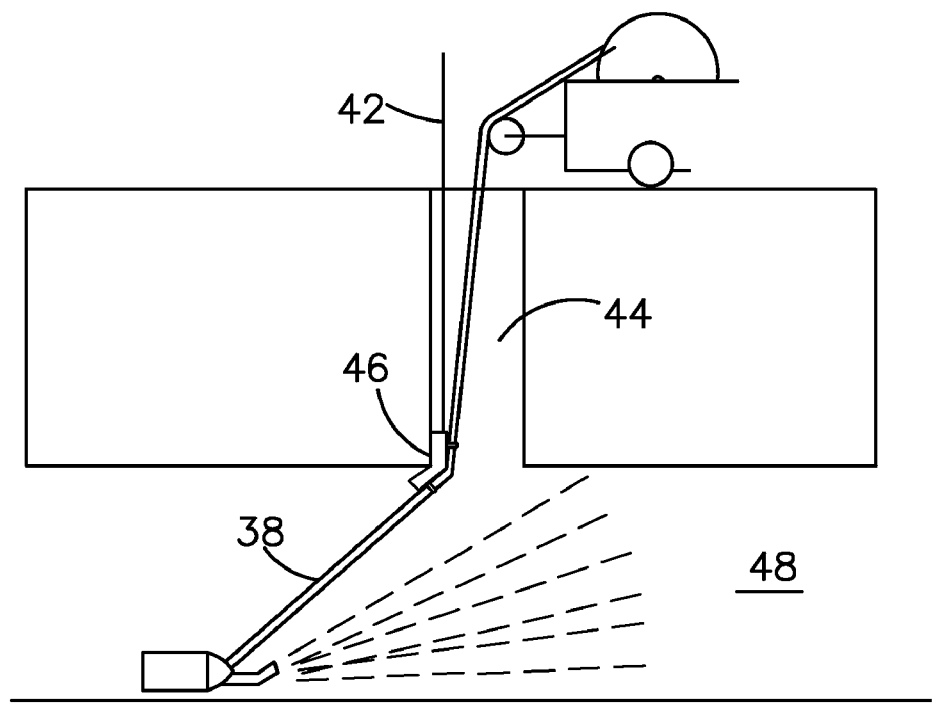
FIG. 4 is a diagrammatic cross-section of a subterranean sewer and an access shaft with a hose and hose protector in the working position.

FIG. 4 shows the manner of use. The protector is laid on a flat surface and the hose 38 is threaded between the arches 34, 36 and the rollers. The wire 42 is tied to the eye 40 and the protector is lowered. As soon as the protector is lowered down vertical access shaft 44, it opens as shown. When the protector reaches the corner 46 of the shaft, the pay out of the hose begins. The hose is hauled along sewer 48 and the tension on the hose can be adjusted allowing lodgement of the protector in the corner 46. Water pressure is increased to blast the sewer wall and travels upstream. Full tension is then safely applied to the hose because the hose merely runs over the rollers. The hose is wound in until the cleaner head 50 supplied by the hose has reached the shaft. If camera inspection reveals that a repeat operation is necessary, the hose is payed out and hauled back in. Throughout this sequence, the protector maintains its position.

Figure 6:
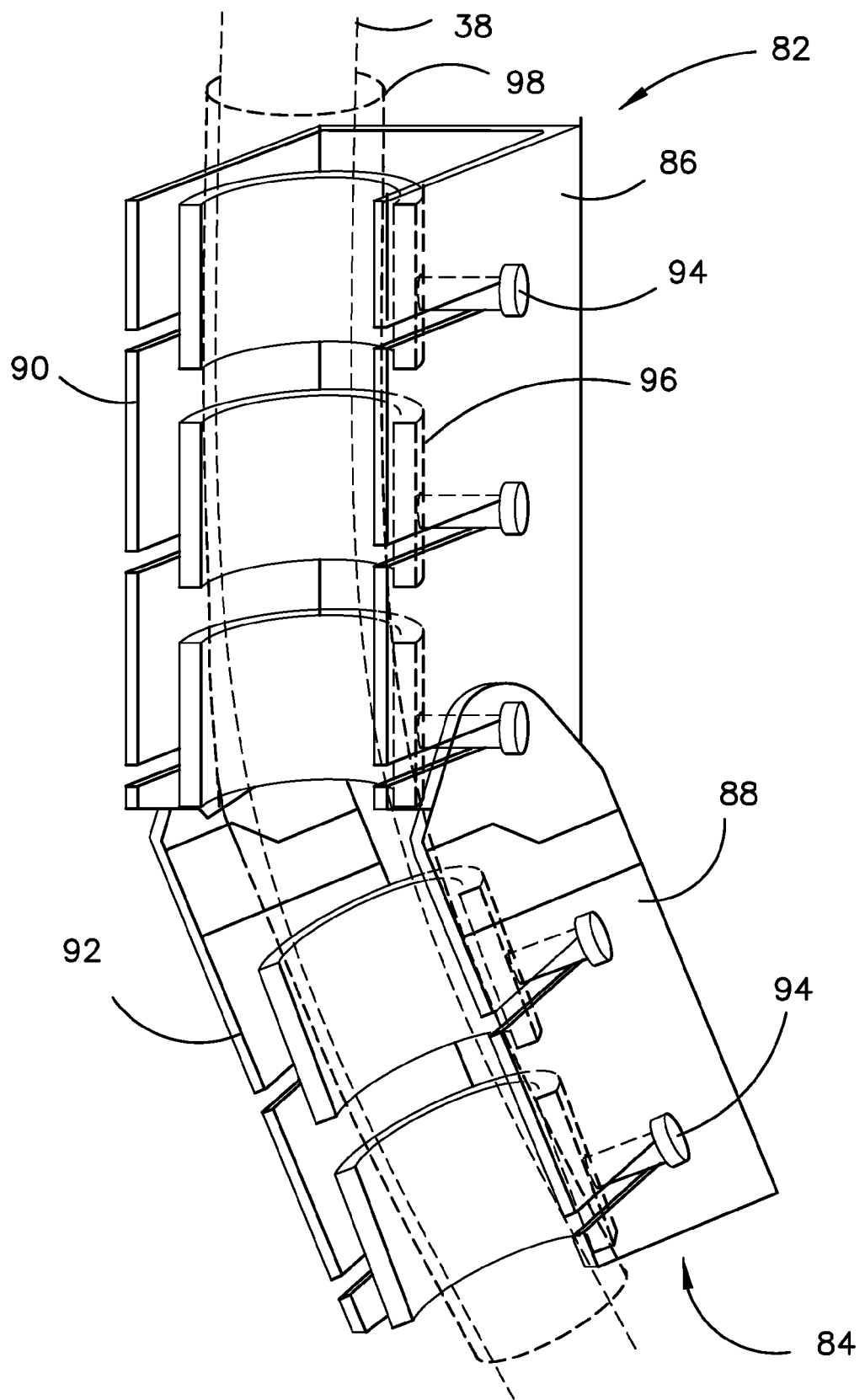
FIG. 6 is a diagrammatic cross section of a variant.

In FIG. 6, the guides 46, 14, 16 are not pairs of plates but channels 82, 84 which articulate like the plates to give the same arc to the nose running through them. Instead of rollers, the sidewalls 86, 88, 90, 92 of the channels act as mounts for a series of side by side pins 94 which in turn carry tube clips 96. The pins are free to rotate. The tube clips 96 have a 240 degree wrap in order to admit and retain a tube 98 made of graphite-filled polymer or other suitable low friction, flexible material which offers low resistance to a hose or cable 38 which runs through it.

Figure 5A:
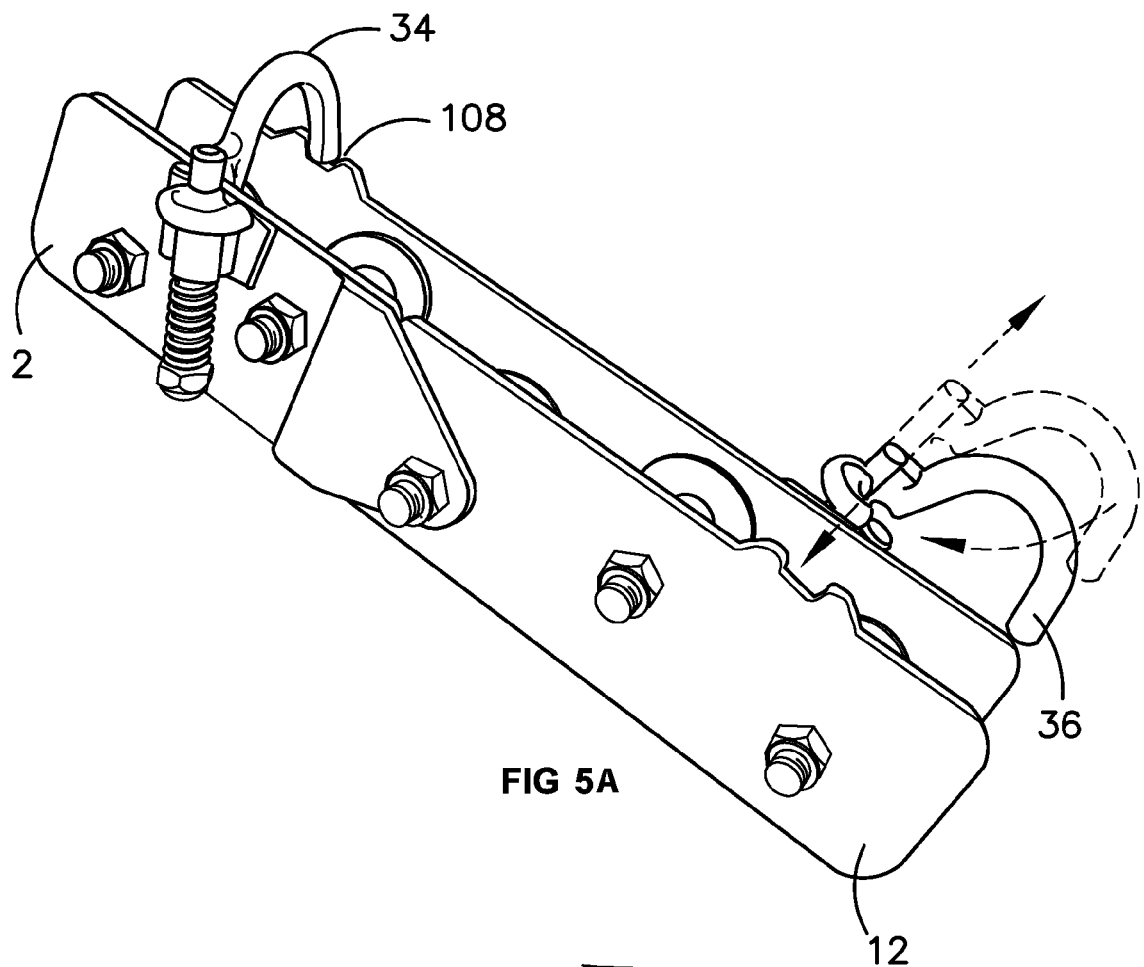
FIG. 5a is a perspective of a variant with a spring load arch.
Figure 5B:
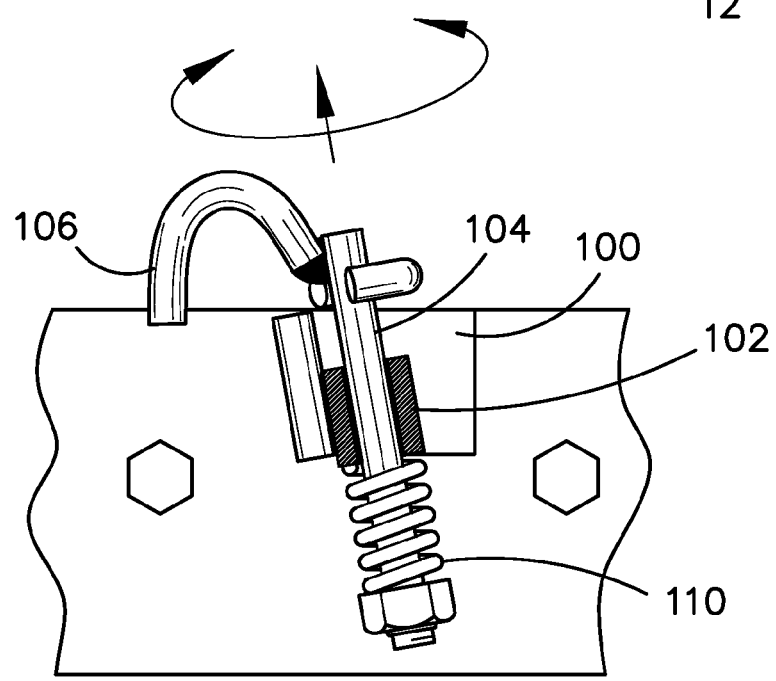

Referring now to FIGS. 5a and 5b, the arches 34, 36 are each mounted on a sidewall of the guides 2, 12. A bracket 100 is welded to the sidewall and a sleeve 102 is welded to the bracket face. The arch is fabricated from a straight rod 104 which slides in the sleeve and a semicircular rod 106 welded to the upper end of the straight rod in order to span the guide. The opposite sidewall has a detent 108 in its edge which arrests the end of the curved rod. Compression spring 110 urges the arch into the detent until the operator lifts it and rotates it to release the hose from the guide. In this embodiment, threading of the hose is obviated, the arches being adjustable as shown in FIG. 5a.

We have found the advantages of the above embodiment to be:

1. A smooth, large radius curve is possible for the hose.
2. A self-positioning action is achieved by articulation.
3. The colinear position of the guides allows free running to the site of the corner.

It is to be understood that the word "comprising" as used throughout the specification is to be interpreted in its inclusive form, ie. use of the word "comprising" does not exclude the addition of other elements.

It is to be understood that various modifications of and/or additions to the invention can be made without departing from the basic nature of the invention. These modifications and/or additions are therefore considered to fall within the scope of the invention.

What is claimed is:

1. A protector for guiding a flexible conduit around an external corner, comprising a pair of elongated hose guides which articulate between a thread position articulating end in which they are colinear and a working position articulating end in which they lie substantially at 90 degrees and hose engagers which extend from said guides and in use maintain attachment of said protector to the hose while allowing the hose to run through said protector, wherein each said hose engager is an arch which is movable between a position overlying each said guide and a release position in which an arch is displaced to allow hose insertion and release to engage the corner and means to define an arcuate conduit path around the corner.

2. A protector as claimed in claim 1, wherein said engagers are hooks or loops.

3. A protector as claimed in claim 1, wherein said articulating ends of said hose guides are of complementary shape so as to limit an angle in said working position from eighty (80) degrees to one hundred twenty (120) degrees.

4. A protector as claimed in claim 3, wherein said angle is one hundred ten (110) degrees.

5. A protector as claimed in claim 1, wherein said means defining an arcuate path around the external corner is a series of wheels or rollers supported in a plurality of guides over which the conduit runs.

6. A protector as claimed in claim 5, wherein said plurality of guides each comprise a pair of side plates joined by multiple rods, each of which supports a conduit roller, said rods being disposed in an arc of such curvature as will turn the conduit through ninety (90) degrees to one hundred ten (110) degrees in a working position.

7. A protector as claimed in claim 1, wherein at least one of said guides has an eye for an attachment of a control line.

8. A protector as claimed in claim 3, wherein said complimentary ends of said guides have mutually obstructing steps which during articulation separate to allow said guides to be colinear.

9. A protector as claimed in claim 1, wherein said means is a series of tube supports and a tube of flexible low friction material through which the hose runs.

10. A protector as claimed in claim 1, wherein said arch is a spring loaded hook which engages in a detent in a surface of said guide.

* * * * *